United States Patent [19]

Garrett et al.

[11] Patent Number: 5,073,156
[45] Date of Patent: Dec. 17, 1991

[54] NONSYNCHRONOUS AUTOMATIC TRANSMISSION WITH OVERDRIVE

[75] Inventors: Roy J. Garrett, Redford Township, Wayne County, Mich.; Alan R. Fisher, Dearborn, both of Mich.

[73] Assignee: Ford Motor Company, Dearborn, Mich.

[21] Appl. No.: 445,880

[22] Filed: Dec. 4, 1989

[51] Int. Cl.$^5$ .............................................. F16H 57/10
[52] U.S. Cl. ...................................... 475/56; 475/59; 475/285
[58] Field of Search ............... 475/285, 284, 297, 324, 475/312, 59, 61, 65, 71

[56] References Cited

U.S. PATENT DOCUMENTS

| | | | |
|---|---|---|---|
| 3,162,063 | 12/1964 | Konrad | 475/119 |
| 3,314,307 | 4/1987 | Egbert | 475/56 |
| 3,339,431 | 9/1967 | Croswhite et al. | 475/56 |
| 3,706,240 | 12/1972 | Borneman et al. | 74/869 |
| 4,036,082 | 7/1977 | Onuma | 475/56 |
| 4,056,990 | 11/1977 | Hatano | 475/59 |
| 4,226,123 | 10/1980 | Croswhite | 475/56 |
| 4,347,765 | 9/1982 | Leonard et al. | 74/869 |
| 4,455,890 | 6/1984 | Kuramochi et al. | 475/59 |
| 4,747,323 | 5/1988 | Kiuchi et al. | 475/285 X |
| 4,934,216 | 6/1990 | Sandel et al. | 475/285 X |
| 4,939,955 | 7/1990 | Sugano | 475/285 X |

FOREIGN PATENT DOCUMENTS

| | | | |
|---|---|---|---|
| 0143350 | 6/1985 | European Pat. Off. | 475/285 |
| 60-95237 | 5/1985 | Japan | 475/285 |

Primary Examiner—Dwight Diehl
Attorney, Agent, or Firm—Frank G. McKenzie; Roger L. May

[57] ABSTRACT

A nonsynchronous, automatic transmission with overdrive which includes a torque converter coupled to an input member, a planetary gear set comprising a forward sun gear, a reverse sun gear and an output member, clutches for selectively coupling the torque converter to the output member through each of a plurality of torque paths, an overdrive brake coupled to the reverse sun gear, a direct clutch for selecting a torque path connection between the input member and the output member, and a one-way clutch coupled to the direct clutch and the forward sun gear. In the preferred embodiment, the planetray gear set is a compound planetary gear set, although separate planetary sets may be combined as desired. The invention can be employed with a variety of torque path configurations. Preferably, the direct clutch and the one-way clutch are coupled in the same clutch housing and actuated by a single piston.

12 Claims, 3 Drawing Sheets

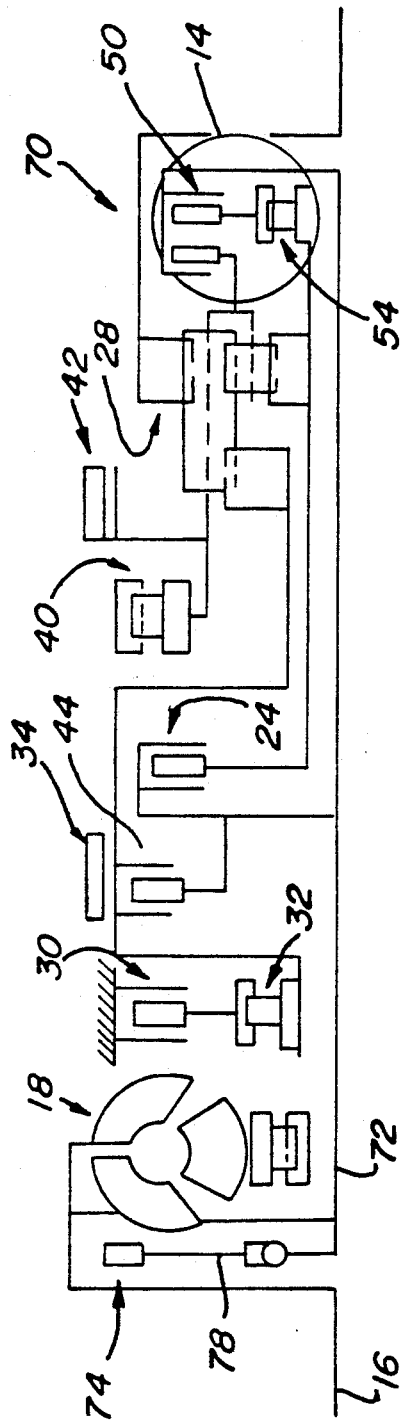
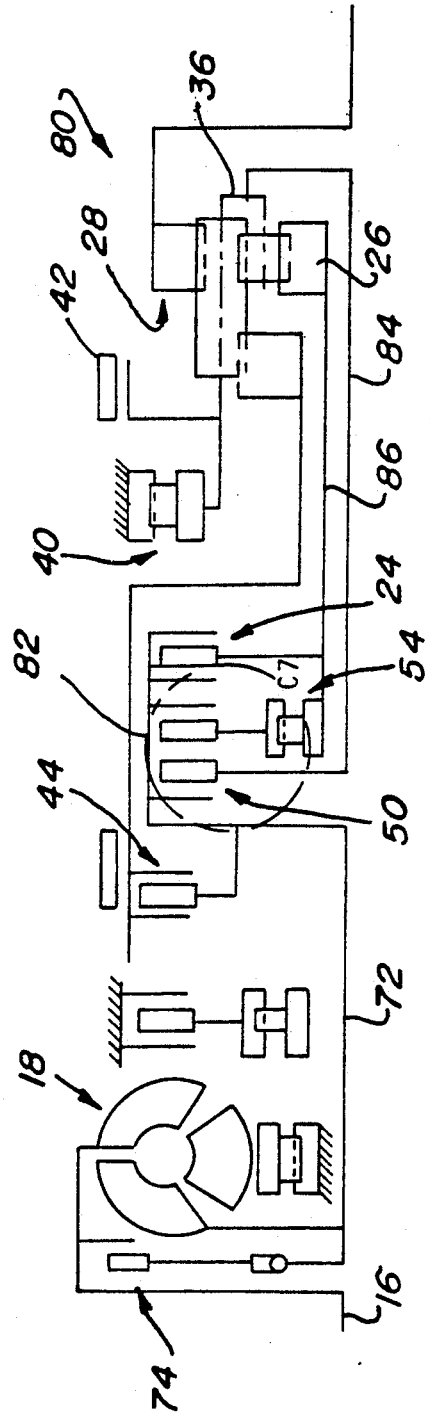

NONSYNCHRONOUS AUTOMATIC TRANSMISSION WITH OVERDRIVE

BACKGROUND OF THE INVENTION

1. Field of The Present Invention

The present invention relates generally to power transfer apparatus for motor vehicles and, more particularly, to an automatic transmission having an overdrive ratio.

2. Description Of The Prior Art

A known production automatic overdrive transmission includes four forward speed ratios including a direct drive ratio and an overdrive ratio in which the input member turns at a slower speed than the output member due to the selected torque path. In this production transmission, the shift between the direct drive ratio and the overdrive ratio requires synchronous engagement of one clutch member while another clutch member is disengaged. Such synchronizing control is provided by a hydraulic control circuit. U.S. Pat. No. 3,314,307 describes such a transmission.

As demonstrated in the following chart, a plurality of shifter positions can be selected, for example, reverse (R), overdrive range (OD), overdrive lock-out range (D), and low gear (U), as well as park and neutral positions (not shown). The engagements of the clutches defining the torque paths are illustrated in the chart below. In the overdrive range, disengagement of the forward clutch must occur in synchronization with the application of the overdrive band so as to reduce abrupt (tie-up) or unduly extended (engine runaway) load changes on the engine and transmission components.

Such synchronous shifting provides several disadvantages. In particular, gradual engagement of the overdrive band increases wear on the band and reduces its durability. Moreover, the transmission referred to above includes an open converter torque path through the forward clutch as well as a direct lock-up torque path through the direct clutch in the direct drive (third gear) ratio. As a result, additional wear is imposed upon the direct clutch, the overdrive band and the forward clutch and, during a 3-4 shift, adversely affects the clutch's durability. Furthermore, tie-up and runaway can only be reduced, but not avoided, in synchronous shifting. Accordingly, the synchronous engagement and disengagement of the separate clutches, which generally takes about one-half second to complete, is quite noticeable to the vehicle operator.

Although series connections of a friction clutch and a one-way clutch are employed in the production version to provide 1-2 and 2-3 shifts nonsynchronously, a proposal to use an additional one-way clutch creates a severe packaging problem. In particular, one-way clutches occupy a substantial amount of space. In addition, such clutches also interrupt reversal of the torque path which permits the engine to act as a brake when deceleration is desirable. Consequently, torque path reversal requires the addition of an additional clutch and its associated controls. Accordingly, the design criteria of drive-line function and packaging deter the skilled artisan from incorporating a serial friction clutch and one-way clutch arrangement for nonsynchronous 3-4 shifts.

U.S. Pat. No. 4,226,123 to Croswhite discloses a transmission in which shifts between the forward speeds, including an overdrive ratio, use one-way clutches for nonsynchronous shifting. However, the forward drive clutch coupled in series with the one-way clutch is positioned axially adjacent to a hill brake clutch assembly. In addition, each of the clutches is operated by a separate piston, which further adds to the complexity, weight and size of the transmission. Moreover, the forward clutch provides an open converter torque path to the forward sun gear so that the sun gear turns at substantially the same speed as the planet carrier coupled to the direct drive shaft by the direct clutch. However, due to torque converter slip, reduced fuel economy accompanies the torque availability in the direct (third gear) drive ratio.

In view of the limited areas in which a transmission can be mounted in the vehicle without obstructing passenger comfort, packaging considerations are often important factors in determining whether new transmission arrangements can be put into production. In particular, re-sizing of a transmission housing can deter the introduction of production transmissions due to extended lead times in the design and preparation for production of the transmissions. The incorporation of additional components to be driven or carried within the transmission also increases fuel consumption and further deters the skilled artisan from redesigning production transmissions to include them.

SUMMARY OF THE PRESENT INVENTION

The present invention overcomes the above-mentioned disadvantages by providing an improved automatic overdrive transmission in which the direct drive to overdrive shift has been made nonsynchronous by combining a one-way clutch with the direct clutch. In general, the one-way clutch is serially connected with another clutch intermediate an input member of the planetary gear set and a driven member of the planetary gear set. In the preferred embodiment, this connection is established together with the engagement of the other clutch, such as engagement of the direct clutch. The improved clutch arrangement is applicable to a variety

CHART A

| Shift Posit'n | Gear | 30 Int. Cl. | 32 Int. O.W.C. | 34 O.D. Band | 44 Rev. Cl. | 24 Fwd. Cl. | 40 Low O.W.C. | 42 Low/Rev. Band | 24 Dir. Cl. |
|---|---|---|---|---|---|---|---|---|---|
| OD. | 1 |   |   |   |   | x | x |   |   |
|     | 2 | x | x |   |   | x | OR |   |   |
|     | 3 | x | OR |   |   | x | OR |   | x |
|     | 4 | x |   | x |   |   | ·OR |   | x |
| D.  | 1 |   |   |   |   | x | x |   |   |
|     | 2 | x | x |   |   | x | OR |   |   |
|     | 3 | x | OR |   |   | x | OR |   | x |
| 1   | 1 |   |   |   |   | x | x | x |   |
| R   |   |   |   |   | x |   |   | x |   | of transmissions and is particularly advantageous for avoiding the controls complexity and packaging problems generally associated with the addition of clutches in a transmission.

In a preferred embodiment of the present invention, the improvement can be employed in an existing production transmission housing by radially expanding the ring gear to a closer tolerance with the wall of the housing, allowing greater room for enlargement of the direct clutch. By increasing the outermost radial dimension of the clutch cylinder, the inside radius of the clutch plates can be increased an even greater amount without reducing the engageable surface area of the clutch plates. Accordingly, the radial face width of the clutch plates is reduced. In addition, a set of clutch plates extending from the one-way clutch are engaged within the clutch cylinder adjacent a set of clutch plates for the input member of the planetary gear set, and the actuating piston operatively engages the clutch cylinder plates against the enclosed sets of plates. Furthermore, the reduced radial face width of the clutch plates provides an area intermediate the direct clutch and a driven member of the planetary gear set in which to position the one-way clutch.

The clutch arrangement of the present invention, therefore, provides a nonsynchronous direct drive to overdrive shift, which provides an improved feel of the shift to the operator of the vehicle. In addition, such an arrangement improves the torque capacity of the overdrive band and the direct clutch as well as increasing the durability of these members. Furthermore, the improved transmission arrangement provides greater fuel economy because selection of the direct drive ratio mechanically locks the engine to the output and is activated solely by the direct clutch, without requiring an open torque converter path. In addition, the direct drive is coast-free when the overdrive mode has been selected. Nevertheless, improved performance and greater power may be applied in the direct drive ratio by an optional open converter torque path downshift selection as desired. These and other advantages of the present invention will be understood from the following detailed description.

BRIEF DESCRIPTION OF THE DRAWINGS

The present invention will be better understood by reference to the following detailed description of the preferred embodiment when read in conjunction with the accompanying drawing in which like reference characters refer to like parts throughout the views and in which:

FIG. 3 is a schematic view showing a modified transmission arrangement in accordance with the present invention;

FIG. 4 is a schematic view showing a further modification of a transmission arrangement according to the present invention.

DETAILED DESCRIPTION OF THE PREFERRED EMBODIMENT

Figure 1:
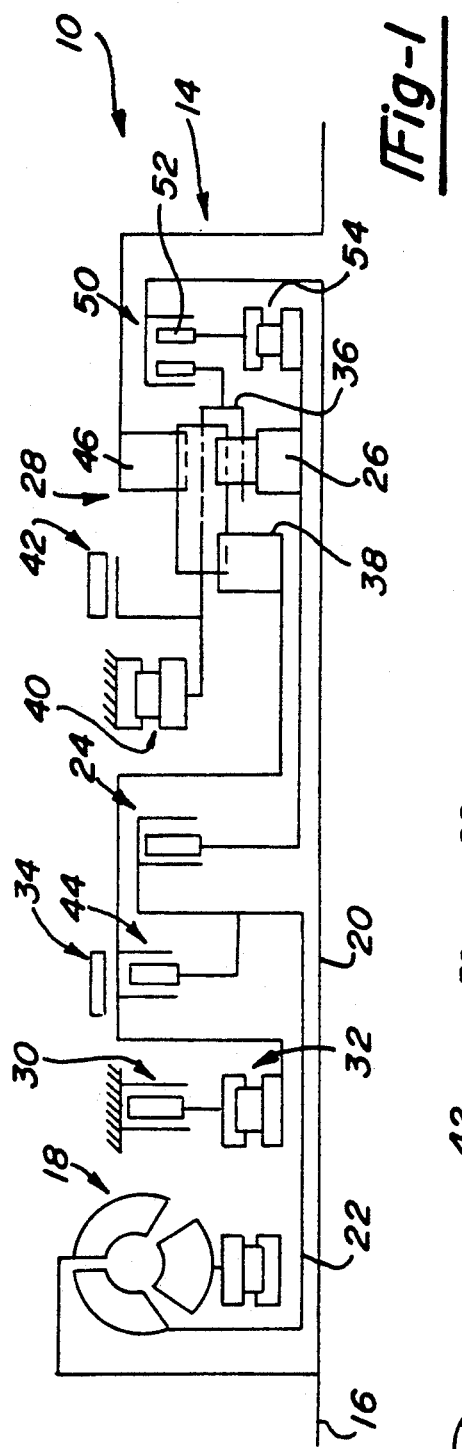
FIG. 1 is a schematic view of an improved transmission arrangement in accordance with the present invention.

Referring first to FIG. 1, the transmission 10 according to the present invention is thereshown incorporating previously known components of a production transmission in combination with an improved clutch arrangement 14. An input 16 from an engine crankshaft or the like is delivered to a torque converter assembly 18 and a direct drive shaft 20. The impeller of the torque converter 18 hydraulically drives the turbine in conjunction with the stator assembly in a well known manner to provide input torque to a turbine input shaft 22.

The turbine input shaft 22 is coupled through a forward clutch 24 to a forward sun gear 26 of a compound planetary gear set 28. Planet carrier 36 of the compound planetary gear set 28 is coupled to a low reaction, one-way clutch 40 which holds the planet carrier 36 stationary in first gear in the OD and D gear selection ranges. One-way clutch 40 overruns or freewheels on an automatic downshift to first gear. A low-reverse band 42 holds the planet carrier 36 stationary in manual low and reverse so as to permit engine braking in the manual low L and reverse R shift positions. The transmission also includes a reverse clutch 44 for coupling the turbine input shaft 22 to the reverse sun gear 38 when reverse drive has been selected. The ring gear 46 of the compound planetary gear set 28 is coupled to the output shaft 48.

An intermediate clutch 30 is serially coupled through an intermediate one-way clutch 32 to the reverse sun gear 38 of the compound planetary gear set 28. In a well known manner, the intermediate clutch holds the reverse sun gear 38 stationary in second gear. The intermediate one-way clutch 32 overruns or freewheels in third gear when the direct clutch drives the planet carrier 36 and the forward clutch 24 drives the forward sun gear at substantially the same speed. An overdrive band 34 is engaged to hold the reverse sun gear 38 stationary in overdrive and when a downshift to manual second gear in a reversible torque coupling path is made by the vehicle operator.

In the previously known production arrangement described above and shown in Chart A, the planet carrier 36 is coupled to the direct drive shaft 20 through a direct clutch. The direct clutch 50 employed in the present invention differs from the prior art direct clutches in that it includes an additional set of clutch plates 52. The clutch plates 52 couple the direct clutch 50 in series with a one-way clutch 54. The radially inner housing of the one-way clutch 54 is coupled to the sun gear 26. As a result, the following charts demonstrate the torque path arrangements available through the transmission arrangement constructed in accordance with the present invention:

| | | | CHART B | | | | | | | | |
|---|---|---|---|---|---|---|---|---|---|---|---|
| Shifter | | 34 | 42 | 24 | 44 | 50 | 40 | 30 | 32 | 54 | Coast | Open |
| Posit'n | Gear | B1 | B2 | C1 | C2 | C3 | C4 | C5 | C6 | C7 | Free | Conv. |
| O.D. | 1 | | | X | | | X | | | | Yes | Yes |
| | 2 | | | x | | | OR | x | x | | Yes | Yes |

-continued

CHART B

| Shifter Posit'n | Gear | 34 B1 | 42 B2 | 24 C1 | 44 C2 | 50 C3 | 40 C4 | 30 C5 | 32 C6 | 54 C7 | Coast Free | Open Conv. |
|---|---|---|---|---|---|---|---|---|---|---|---|---|
| (Opt.) | 3 | | | x | x | | OR | x | OR | | No | Yes |
| | 3a | | | x | | x | OR | x | OR | x | No | No |
| | 3b | | | | | x | OR | x | OR | x | Yes | No |
| | 4 | x | | | | x | OR | x | | OR | No | No |
| D | 1 | | | x | | | x | | | | Yes | Yes |
| | 2 | | | x | | | OR | x | x | | Yes | Yes |
| (Opt.) | 3 | | | x | x | x | OR | x | OR | | No | No |
| | 3a | | | x | | x | OR | x | OR | x | No | No |
| | 3b | | | | | x | OR | x | OR | x | Yes | No |
| 2 | 2 | x | | x | | | | x | x | | No | Yes |
| L | 1 | | x | x | | | | | | | No | Yes |
| Rev | Rev | | x | | x | | | | | | No | Yes |

Figure 2:
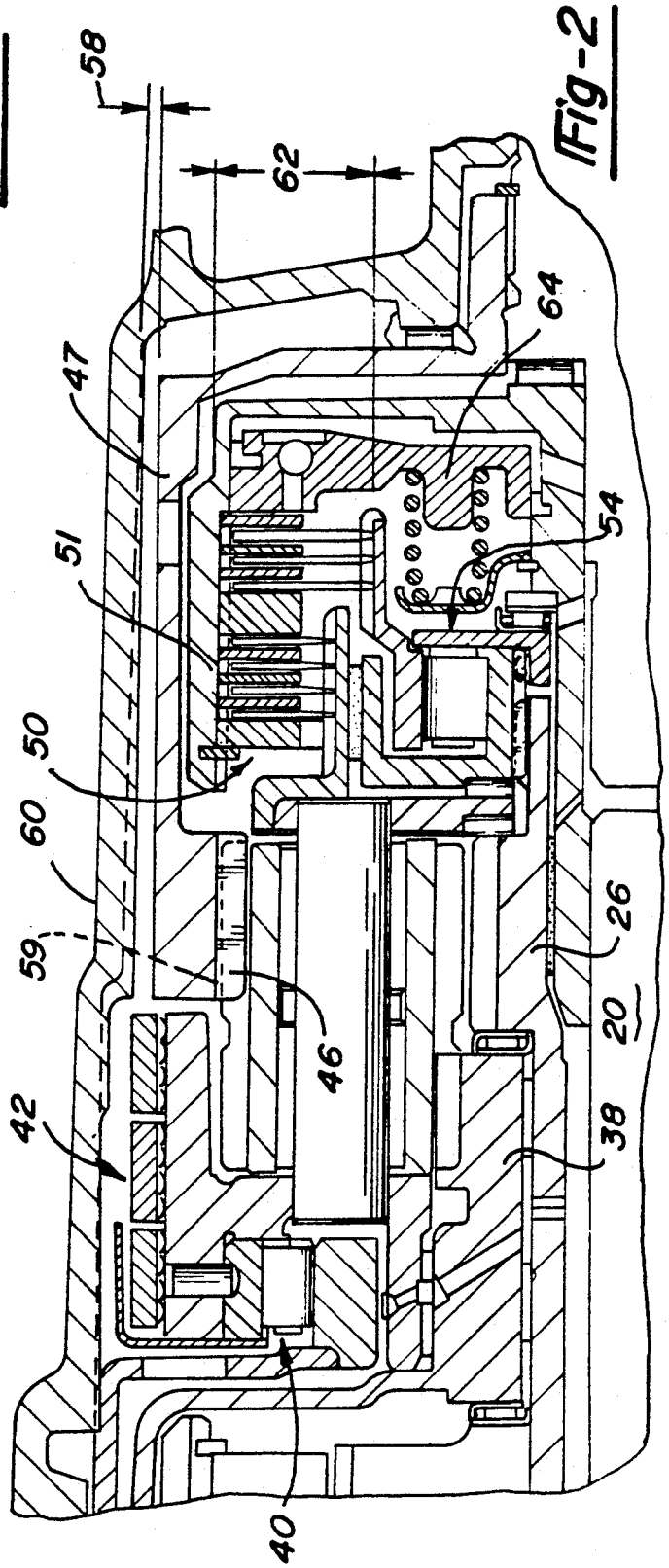
FIG. 2 is a fragmentary cross-sectional view of a transmission as shown in FIG. 1.

As shown in FIG. 2, an axially elongated sleeve 47 on the ring gear 46 has been positioned in closer tolerance to the interior wall of the known production transmission housing 60, as indicated at the spacing dimension 58. The original sleeve position is shown in phantom line at 59 in FIG. 2. As a result, the outer housing 51 of the direct clutch 50 can be made with a radially enlarged dimension and installed in the same size housing. Moreover, the increase in outer radially diameter permits a reduction in the radial face width 62 of the clutch plates without reducing engageable area of the clutch plates. As a result, the axial extension 37 of the planet carrier 36 can be spaced apart from the axis of the drive shafts 20, 22 so as to provide room accommodating the one-way clutch 54 radially inwardly of the direct clutch 50. The piston 64 is operated by a piston servo in substantially the same manner as the piston operates the previously known direct clutches to engage the set of clutch plates 52 coupled with the one-way clutch 54, as well as the direct clutch plates carried by the planet carrier 36, by the plates of the clutch cylinder in response to movement of the piston 64.

As a result, it will be understood that the transmission arrangement 10 operates in substantially the same manner as the previously known production transmission in selection of reverse gear, low gear, and a 1-2 shift. However, in contrast to the previously known production transmission, engagement of direct clutch 50 couples both the sun gear 26 and the planet carrier 36 to the direct shaft 20. These two components of the planetary gear set 28 are, therefore, locked together, and a mechanical, direct ratio connection is made between the output 48 and the direct drive shaft so that they rotate at the same speed. Moreover, in contrast to the known production embodiment in which the forward clutch must be engaged in third gear in order to drive the sun gear 26 at substantially the same speed as the planet carrier 36, the clutch 24 can be disengaged without affecting the direct drive ratio. As a result, the disengagement can occur nonsynchronously with the engagement of a direct clutch 50.

Moreover, as the overdrive band 34 is applied during the 3-4 shift to lock the large reverse sun gear 38, the connection between the sun gear 26 and the one-way clutch 54 permits the clutch 54 and thus the sun gear 26 to overrun and provide an output speed at 48 which exceeds the input speed of the direct shaft 20. Accordingly, synchronized disengagement of the forward clutch 24 during the engagement of the overdrive band 34 is avoided. As a result, the shift from 3 to 4 becomes less noticeable to the operator of the vehicle than previously when a proper synchronous shift was made. Moreover, since the turbine input shaft 22 is no longer coupled to the sun gear 26 in the direct drive mode, the transmission arrangement provides greater fuel economy in that range as well as during the 3-4 shift. Nevertheless, a manual pull-in downshift to the shift position D (3rd gear) engages the forward clutch 24 to permit increased acceleration through a partially open torque converter path, as well as the direct clutch as shown at shift position 3a. Subsequently, the forward clutch 24 is nonsynchronously disengaged, as shown at 3b. In addition, the optional third gear torque path shown in Chart B engages both the forward clutch 24 and the reverse clutch 44, rather than the direct clutch 50. This fully open converter torque path reduces noise, vibration, and harshness problems which can arise in the other third gear torque paths.

FIG. 3 discloses a modified transmission arrangement 70 which also incorporates the structure and advantages of the direct clutch coupled with a one-way clutch intermediate the planet carrier and the sun gear. In the transmission configuration 70, the direct drive shaft 20 is replaced by a shaft 72 coupled to the turbine of the torque converter 18. The turbine input shaft 72 also includes a leg 78 selectively coupled to the input member 16 by a bypass clutch 74. Accordingly, the turbine input shaft 72 is coupled to both the forward clutch 24 and the direct clutch 50. The remaining clutches are substantially the same as discussed in the previous configuration. Moreover, the transmission configuration 70 includes the same hydraulic actuating system as a transmission system having a turbine shaft 27 and bypass clutch 74 but with synchronous engagement of the overdrive band 34 during disengagement of the forward clutch 24, except that the forward clutch 24 does not engage in third gear when the bypass clutch 74 is actuated and the manual low shift position L does not have an automatic 2-1 downshift. Nonetheless, all the shifts are nonsynchronous and operate in the manner shown in the following chart:

CHART C

| Shifter Posit'n | Gear | 34 B1 | 42 B2 | 24 C1 | 44 C2 | 50 C3 | 40 C4 | 30 C5 | 32 C6 | 54 C7 | Coast Free |
|---|---|---|---|---|---|---|---|---|---|---|---|
| O.D. | 1 | | | x | | | x | | | | Yes |
| | 2 | | | x | | | OR | x | x | | Yes |

-continued

CHART C

| Shifter Posit'n | Gear | 34 B1 | 42 B2 | 24 C1 | 44 C2 | 50 C3 | 40 C4 | 30 C5 | 32 C6 | 54 C7 | Coast Free |
|---|---|---|---|---|---|---|---|---|---|---|---|
| | 3a | | | x | x | OR | x | OR | | x | No |
| | 3b | | | | x | OR | x | OR | | x | Yes |
| | 4 | x | | | x | OR | x | | | OR | No |
| D | 1 | | | x | | | x | | | | Yes |
| | 2 | | | x | | OR | | x | | | Yes |
| | 3 | | | x | x | OR | | x | OR | | No |
| 2 | 2 | x | | x | | | | x | x | | No |
| L | 1 | | x | x | | | | | | | No |
| Rev | Rev | | x | | x | | | | | | No |

The above chart also applies to the configuration shown in FIG. 4. However, in the transmission arrangement 80 shown in FIG. 4, the direct clutch and the forward clutch are housed in a single clutch cylinder 82 intermediate the low reaction clutch 40 and the reverse clutch 44. The turbine input shaft 72 terminates at the clutch cylinder 82, whereby an output shaft 84 couples the direct clutch 50 to the planetary carrier 36 and a sleeve shaft 86 couples the one-way clutch 54 with the forward clutch 24 and the sun gear 26. Accordingly, such a configuration takes advantage of the larger radial dimension of the transmission housing which may be available forwardly of the planetary gear set 28 to further reduce packaging requirements for the transmission configuration.

Figure 5:
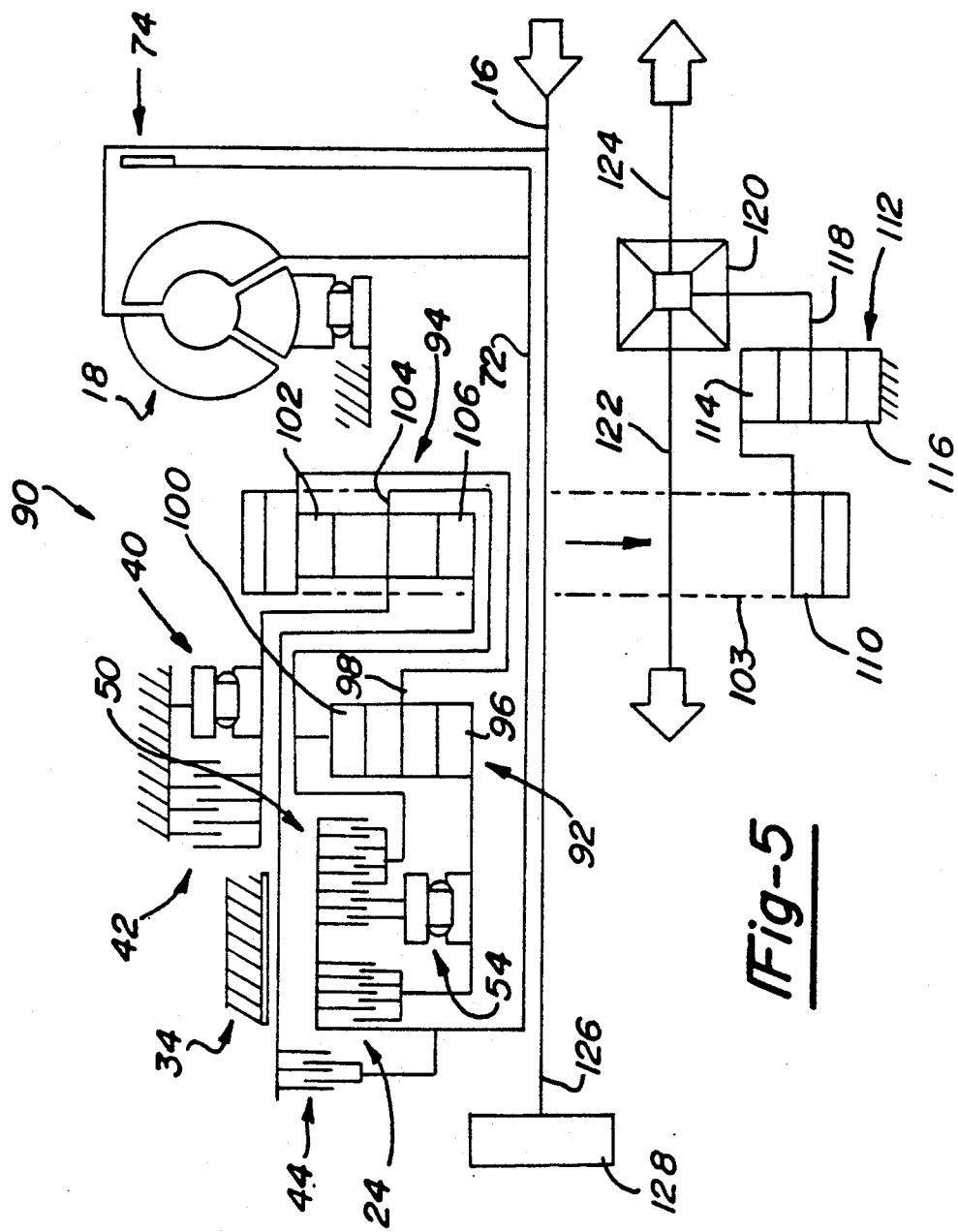
FIG. 5 is a schematic view of a further modified transmission arrangement in accordance with the present invention.

Referring now to FIG. 5, a transverse, front wheel drive configuration 90 for a transmission is thereshown constructed in accordance with the present invention. In the FIG. 5 transmission arrangement, the clutch and brake assemblies of the type previously discussed are applied to separate planetary gear sets 92 and 94. As in the previous embodiment, the forward clutch 24 and the direct clutch 50 share a common clutch housing, with the forward clutch 24 and the one-way clutch 54 coupled to the forward sun gear 96. The planet carrier 98 of the planetary gear set 92 is coupled to the ring gear 102 of the planetary gear set 94. Both the low reaction one-way clutch 40 and the reverse brake 42 are coupled through the planet carrier 104 of the gear set 94 to the ring gear 100 of the gear set 92 and the direct clutch 50. The reverse sun gear 106 of the gear set 94 is coupled through the reverse clutch 44 to the turbine drive shaft 72.

The ring gear 102 drives a chain 103 coupling the transmission arrangement 90 to a transverse drive line arrangement including a driven sprocket 110 coupled for input to the sun gear 114 of a planetary gear set 112. The ring gear 116 of the planetary gear set 112 is locked to a drive line housing, while the planet carrier 118 of the gear set drives a differential gear mechanism 120 whose outputs 122 and 124 are aligned with the axis of the input 16. Also aligned on a parallel axis is a pump drive shaft 126 for operating a hydraulic pump 128 of the transmission. This consolidated packaging for the purposes of a front wheel drive or, alternatively, multiple axle drives, also provides the advantages of nonsynchronous 3-4 shifting with the 1-2 nonsynchronous shift. The advantages of relying upon the direct clutch for mechanically driving third and fourth forward speed ratios without requiring the synchronous release of the forward clutch as the overdrive band is applied will be evident from the following chart:

CHART D

| Shifter Posit'n | Gear | 24 C1 | 44 C2 | 50 C3 | 34 B0 | 42 B1 | 54 OWC0 DR | 54 OWC0 CO | 40 OWC1 DR | 40 OWC1 CO | Coast Brake | Convention |
|---|---|---|---|---|---|---|---|---|---|---|---|---|
| O.D. | 1 | x | | | | | — | — | x | — | No | "x"-element |
| | 2 | x | | | x | | — | — | OR | OR | Yes | transmits |
| | 3a | x | | x | | | x | x | OR | OR | Yes | torque |
| | 3b | | x | | | | x | OR | OR | OR | No | |
| | 4 | | | x | x | | OR | OR | OR | OR | Yes | |
| D | 1 | x | | | | | — | — | x | — | No | "OR"-overrunning |
| | 2 | x | | | x | | — | — | OR | OR | Yes | |
| | 3 | x | | x | | | — | — | OR | OR | Yes | "—"-no race |
| 2 | 2 | x | | | x | | OR | OR | OR | OR | Yes | relative |
| L | 1 | x | | | | x | — | — | x | — | Yes | rotation/ |
| | 2 | x | | | x | | — | — | OR | OR | Yes | no torque |
| Rev | Rev | | x | | | x | — | — | — | — | Yes | transmitted |

Consequently, it will be understood that the present invention provides nonsynchronous 3-4 and 4-3 shifts in a four-speed automatic overdrive transmission in a wide variety of transmission configurations. In particular, the coupling of the direct clutch and a one-way clutch intermediate the planet carrier and the forward sun gear provides fuel economy advantages as well as reduced wear on parts formerly subjected to wear due to synchronous engagement and disengagement of the clutches. Nonetheless, the arrangements permit open converter torque paths even in a direct drive shift position, although the need for doing so has been substantially reduced. Furthermore, the improved clutch configuration 14 of the present invention provides substantial space saving advantages in both the clutch construction and the transmission housing size. Accordingly, the invention avoids the problems of previously known nonsynchronous shift mechanisms previously avoided for packaging reasons.

Having thus described the present invention, many modifications thereto will become apparent to those skilled in the art to which it pertains without departing from the scope and spirit of the present invention as defined in the appended claims.

What is claimed is:

1. An automatic transmission comprising:
   an input member;
   a torque converter coupled to said input member;
   a planetary gear set comprising a forward sun gear, a reverse sun gear, and an output member;
   clutch means for selectively coupling said torque converter to said output member through each of a plurality of torque paths;
   an overdrive brake engageable with said reverse sun gear;
   a direct clutch for selectively coupling said input member to said output member; and
   a one-way clutch coupled to said direct clutch and said forward sun gear.

2. The invention as described in claim 1 wherein said direct clutch is axially adjacent said planetary gear set.

3. The invention as described in claim wherein said one-way clutch is positioned radially inwardly of said direct clutch.

4. The invention as described in claim 1 and further comprising a turbine input shaft from said torque converter and a drive shaft member coupled to said input member, and wherein said direct clutch is coupled to said drive shaft.

5. The invention as described in claim 1 and further comprising a turbine input shaft from said torque converter and a bypass clutch means for coupling said turbine input shaft to said input member.

6. The invention as described in claim 1 wherein said planetary gear set comprises a first set of gears comprising a first ring gear, a first planetary carrier including first planet gears and a forward sun gear, and a second set of gears comprising a second ring gear, a second planet carrier including second planet gears, and a reverse sun gear.

7. The invention as described in claim wherein said clutch means includes a forward clutch and wherein said direct clutch and said forward clutch are carried in a common clutch cylinder.

8. In combination with an automatic transmission having four forward speed selections including a direct drive speed and an overdrive speed in which a direct clutch couples the carrier of a planetary gear set to an input shaft, the improvement comprising:
   a one-way clutch coupling the direct clutch to a sun gear of the planetary set and positioned radially between the direct clutch and the sun gear.

9. The invention as described in claim 8 wherein said transmission includes a forward clutch and wherein said direct clutch is axially adjacent said forward clutch.

10. The invention as described in claim 9 wherein said forward clutch and said direct clutch share a common clutch housing.

11. An automatic transmission comprising:
   an input member
   a torque converter coupled to said input member;
   a planetary gear set comprising a forward sun gear, a reverse sun gear, and an output member;
   clutch means for selectively coupling said torque converter to said output member through each of a plurality of torque paths;
   an overdrive brake engageable with said reverse sun gear;
   a direct clutch for selectively coupling said input member to said output member; and
   a one-way clutch coupled to said direct clutch and said forward sun gear;
   wherein said planetary gear set has a planetary gear carrier, and further wherein said direct clutch comprises a clutch cylinder having a set of clutch cylinder plates, a first set of clutch plates received in said clutch cylinder and coupled to said planet carrier and a second set of clutch plates received in said clutch cylinder and coupled to said one-way clutch.

12. The invention as described in claim 11 wherein said direct clutch includes a single piston for displacing said clutch cylinder plates into engagement with said first and second sets of clutch plates.

* * * * *

UNITED STATES PATENT AND TRADEMARK OFFICE
CERTIFICATE OF CORRECTION

PATENT NO. : 5,073,156

DATED : December 17, 1991

INVENTOR(S) : Roy J. Garrett, et al

It is certified that error appears in the above-identified patent and that said Letters Patent is hereby corrected as shown below:

Column 4, line 67 (Chart B), delete the capital "X"s and substitute lowercase "x"s in place thereof.

Column 5, line 25, delete "radially" and substitute --radial--.

Column 5, line 49, after "shaft" insert --20--.

Column 9, line 42 (Claim 7, after "claim" insert --1--.

Signed and Sealed this

Sixth Day of April, 1993

Attest:

STEPHEN G. KUNIN

*Attesting Officer*      *Acting Commissioner of Patents and Trademarks*